United States Patent
Kawada

(10) Patent No.: US 11,412,438 B2
(45) Date of Patent: Aug. 9, 2022

(54) RADIO COMMUNICATION APPARATUS, COMMUNICATION METHOD, AND PROGRAM

(71) Applicant: NEC Corporation, Tokyo (JP)

(72) Inventor: Koji Kawada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 17/141,739

(22) Filed: Jan. 5, 2021

(65) Prior Publication Data

US 2021/0211968 A1 Jul. 8, 2021

(30) Foreign Application Priority Data

Jan. 6, 2020 (JP) .............................. JP2020-000293

(51) Int. Cl.
| | |
|---|---|
| *H04W 40/34* | (2009.01) |
| *H04W 36/22* | (2009.01) |
| *H04W 52/02* | (2009.01) |
| *H04W 40/24* | (2009.01) |

(52) U.S. Cl.
CPC ........... *H04W 40/34* (2013.01); *H04W 36/22* (2013.01); *H04W 40/248* (2013.01); *H04W 52/0206* (2013.01)

(58) Field of Classification Search
CPC ... H04W 40/34; H04W 36/22; H04W 40/248; H04W 52/0206
USPC .............................................. 370/329
See application file for complete search history.

(56) References Cited

U.S. PATENT DOCUMENTS

2018/0220283 A1 * 8/2018 Condeixa ................ H04L 67/12

FOREIGN PATENT DOCUMENTS

| CA | 2775416 A1 * | 10/2012 | .......... H04W 40/246 |
|---|---|---|---|
| JP | 2015-231071 A | 12/2015 | |

* cited by examiner

*Primary Examiner* — Gbemileke J Onamuti
(74) *Attorney, Agent, or Firm* — Sughrue Mion, PLLC

(57) ABSTRACT

A radio communication apparatus capable of, in a network in which communication may be performed by simultaneously using a plurality of communication paths, improving (e.g., extending) the operating time of the whole network are provided. A radio communication apparatus includes a power-supply information management unit configured to manage power-supply information of another radio communication apparatus for each of N redundant communication paths (N is an integer equal to or greater than two), and a communication management unit configured to perform switching, based on an amount of traffic to be transmitted and the power-supply information, between communication using n communication paths (n is an integer no smaller than two and no greater than N) among the N communication paths and communication using m communication paths (m is an integer no smaller than one and smaller than n (i.e., m<n)) among the N communication paths.

8 Claims, 6 Drawing Sheets

| APPARATUS NAME | POWER-SUPPLY TYPE | REMAINING BATTERY AMOUNT |
|---|---|---|
| NE1 | STORAGE BATTERY | 100 % |
| NE2 | COMMERCIAL POWER SUPPLY | — |
| ⋮ | ⋮ | ⋮ |

Fig. 5

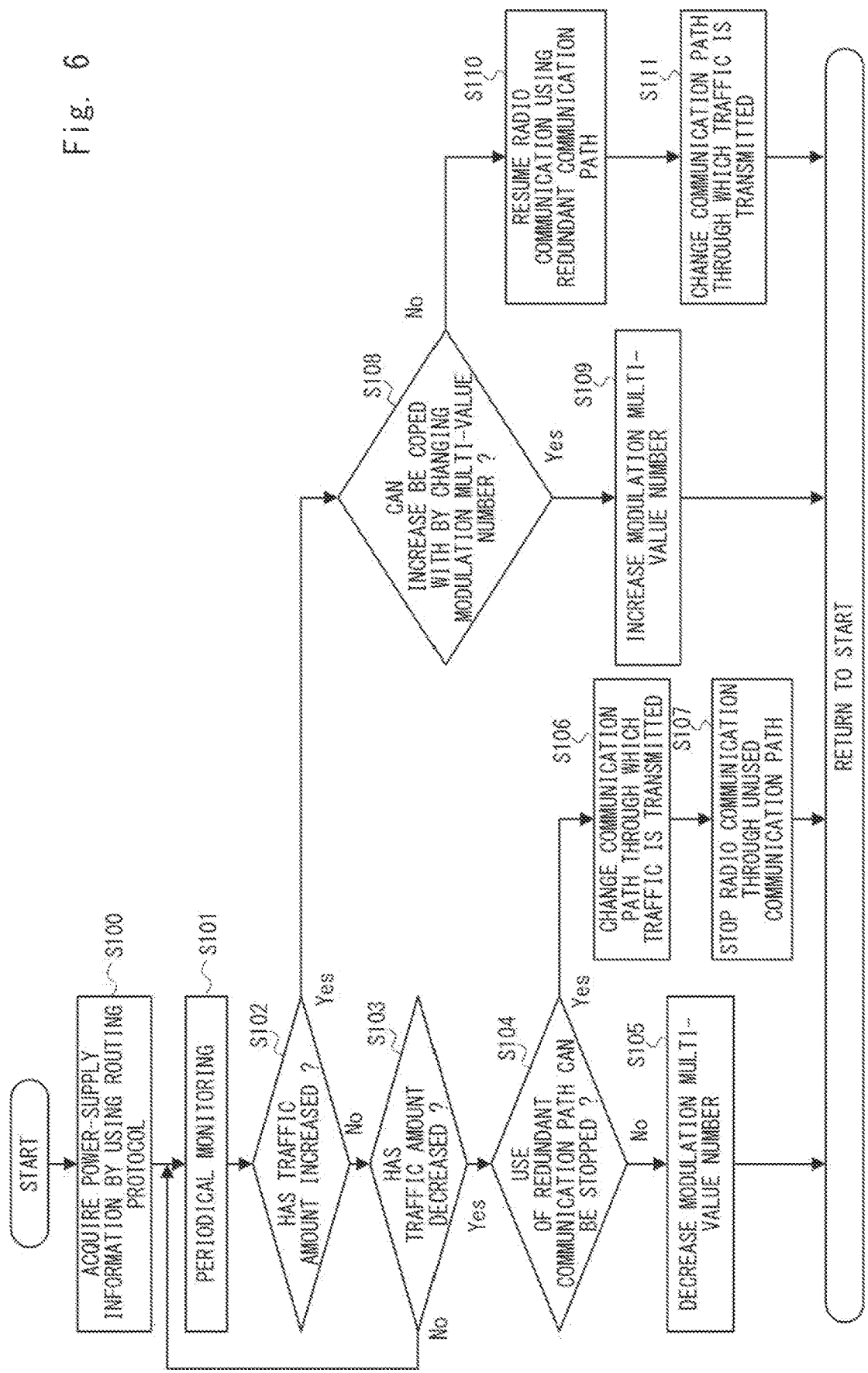

RADIO COMMUNICATION APPARATUS, COMMUNICATION METHOD, AND PROGRAM

INCORPORATION BY REFERENCE

This application is based upon and claims the benefit of priority from Japanese patent application No. 2020-000293, filed on Jan. 6, 2020, the disclosure of which is incorporated herein in its entirety by reference.

TECHNICAL FIELD

The present disclosure relates to a radio communication apparatus, a communication method, and a program.

BACKGROUND ART

In areas where there is no commercial power supply, wireless mobile backhaul may be operated (i.e., used) by using solar power generation and a storage battery. In such a case, in general, the power consumption of a radio communication apparatus can be covered by the solar power generation in the daytime, and the radio communication apparatus is operated by using only the power stored in the storage battery at night. However, if the weather is bad the next day, the power is not sufficiently generated by the solar power generation and hence the stored power is used up. In such a case, line disconnection occurs, thus making the monitoring of the radio communication apparatus impossible. Therefore, it is necessary to control the power consumption of the radio communication apparatus so that even when power cannot be generated by sunlight, signal transmission can be continued by using only the storage battery.

As a technique related to the above-described matter, Japanese Unexamined Patent Application Publication No. 2015-231071 discloses a system in which a possibility that a path that passes through (i.e., uses) a network control apparatus driven by a battery is constructed is reduced and hence the life of the battery is extended (i.e., increased).

SUMMARY

In the technique disclosed in Japanese Unexamined Patent Application Publication No. 2015-231071, only one of a plurality of communication paths is selected in order to extend the life of the battery in the network in which communication is performed. That is, Japanese Unexamined Patent Application Publication No. 2015-231071 does not disclose any technique for extending the life of a battery in a network in which communication may be performed by simultaneously using a plurality of communication paths as in the case of link aggregation. In other words, there has been a need to provide a technique for extending the life of a battery in such a network.

Therefore, in view of the above-described problem (i.e., the above-described need), an example object of the disclosure is to provide a radio communication apparatus, a communication method, and a program capable of, in a network in which communication may be performed by simultaneously using a plurality of communication paths, improving (e.g., extending) the operating time of the whole network.

In a first example aspect, a radio communication apparatus includes:

a power-supply information management unit configured to manage power-supply information of another radio communication apparatus for each of N redundant communication paths (N is an integer equal to or greater than two); and a communication management unit configured to perform switching, based on an amount of traffic to be transmitted and the power-supply information, between communication using n communication paths (n is an integer no smaller than two and no greater than N) among the N communication paths and communication using m communication paths (m is an integer no smaller than one and smaller than n (i.e., m<n)) among the N communication paths.

In a second example aspect, a communication method includes:

managing power-supply information of another radio communication apparatus for each of N redundant communication paths (N is an integer equal to or greater than two); and performing switching, based on an amount of traffic to be transmitted and the power-supply information, between communication using n communication paths (n is an integer no smaller than two and no greater than N) among the N communication paths and communication using m communication paths (m is an integer no smaller than one and smaller than n (i.e., m<n)) among the N communication paths.

In a third example aspect, a program causes a computer to perform:

a step of managing power-supply information of another radio communication apparatus for each of N redundant communication paths (N is an integer equal to or greater than two); and a step of performing switching, based on an amount of traffic to be transmitted and the power-supply information, between communication using n communication paths (n is an integer no smaller than two and no greater than N) among the N communication paths and communication using m communication paths (m is an integer no smaller than one and smaller than n (i.e., m<n)) among the N communication paths.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 5 is a table showing an example of power-supply information managed in a database; and FIG. 6 is a flowchart showing an example of operations performed by a radio communication apparatus according to an example embodiment.

EXAMPLE EMBODIMENT

For clarifying the explanation, the following descriptions and the drawings are partially omitted and simplified as appropriate. Note that the same symbols are assigned to the same elements throughout the drawings, and redundant explanations are omitted as necessary.

Overview of Example Embodiment

Figure 1:
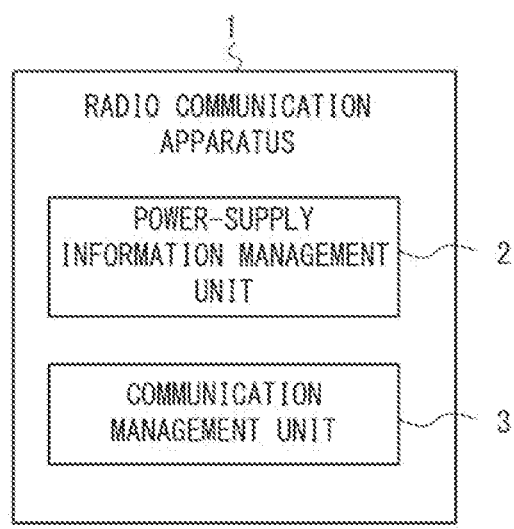
FIG. 1 is a block diagram showing an example of a configuration of a radio communication apparatus according to an outline of an example embodiment.

Prior to a detailed description of an example embodiment, an overview of the example embodiment will be described. FIG. 1 is a block diagram showing an example of a configuration of a radio communication apparatus 1 according to an outline of an example embodiment. As shown in FIG. 1, the radio communication apparatus 1 includes a power-supply information management unit 2 and a communication management unit 3, and performs radio communication with other radio communication apparatuses.

The power-supply information management unit 2 manages power-supply information of other radio communication apparatuses for each of N redundant communication paths (N is an integer equal to or greater than two). The plurality of redundant communication paths can be expressed as a group of communication paths (hereinafter also referred to as a communication path group) bundled by link aggregation. For example, when there are N communication paths as communication paths from the radio communication apparatus 1 to a certain transmission destination, the power-supply information management unit 2 of the radio communication apparatus 1 manages power-supply information of one or a plurality of other radio communication apparatuses that relay communication in a k-th communication path ($1 \leq k \leq N$). Note that the power-supply information is information including information indicating a type of the power supply (hereinafter also referred to as a power-supply type) of the other radio communication apparatuses. The power-supply type is information indicating at least whether the power supply is a storage battery or not. When the power-supply type is a power supply other than the storage battery, the power supply may be specified in a specific manner, for example, specified as a "commercial power supply". Note that the power-supply information is not limited to the power-supply type, and may include other information such as the remaining battery amount of the storage battery.

The communication management unit 3 performs switching, based on the amount of traffic that the radio communication apparatus 1 should transmit and the power-supply information managed by the power-supply information management unit 2, between communication using n communication paths (n is an integer no smaller than two and no greater than N) among the aforementioned N communication paths and communication using m communication paths (m is an integer no smaller than one and smaller than n (i.e., m<n)) among these N communication paths. Such control performed by the communication management unit 3 can be considered to be control of the number of communication paths bundled by link aggregation. Note that when the number of communication paths bundled by the link aggregation is one, i.e., when the communication is switched to communication using only one of the plurality of communication paths, it means that the link aggregation is not performed.

By the above-described configuration, the communication management unit 3 can switch the communication so that, for example, some of or all the communication paths through which signals are relayed by radio communication apparatuses whose power-supply types are storage batteries are not used. As a result, it is possible to reduce the power consumption of the storage battery. Therefore, according to the above-described configuration or the method, it is possible, in a network in which communication may be performed by simultaneously using a plurality of communication paths, to improve (e.g., extend) the operating time of the whole network.

Details of Example Embodiment

Figure 2:
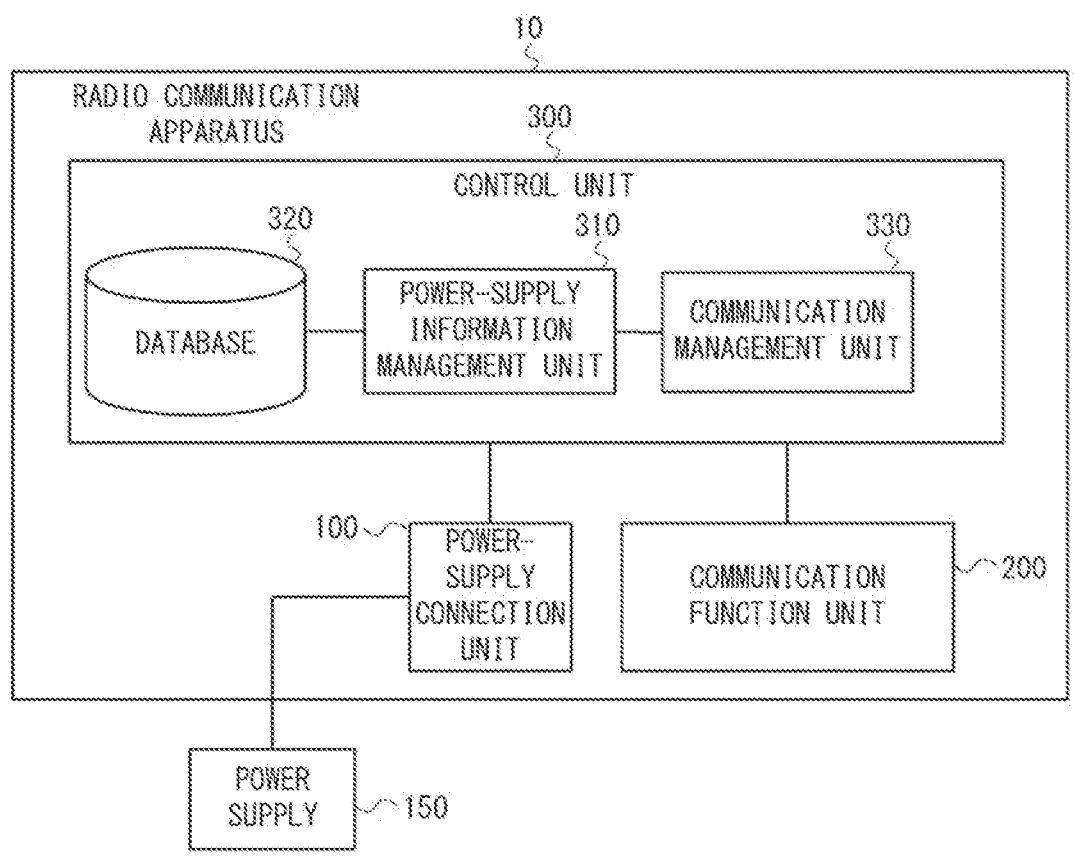
FIG. 2 is a block diagram showing an example of a configuration of a radio communication apparatus according to an example embodiment.
Figure 3:
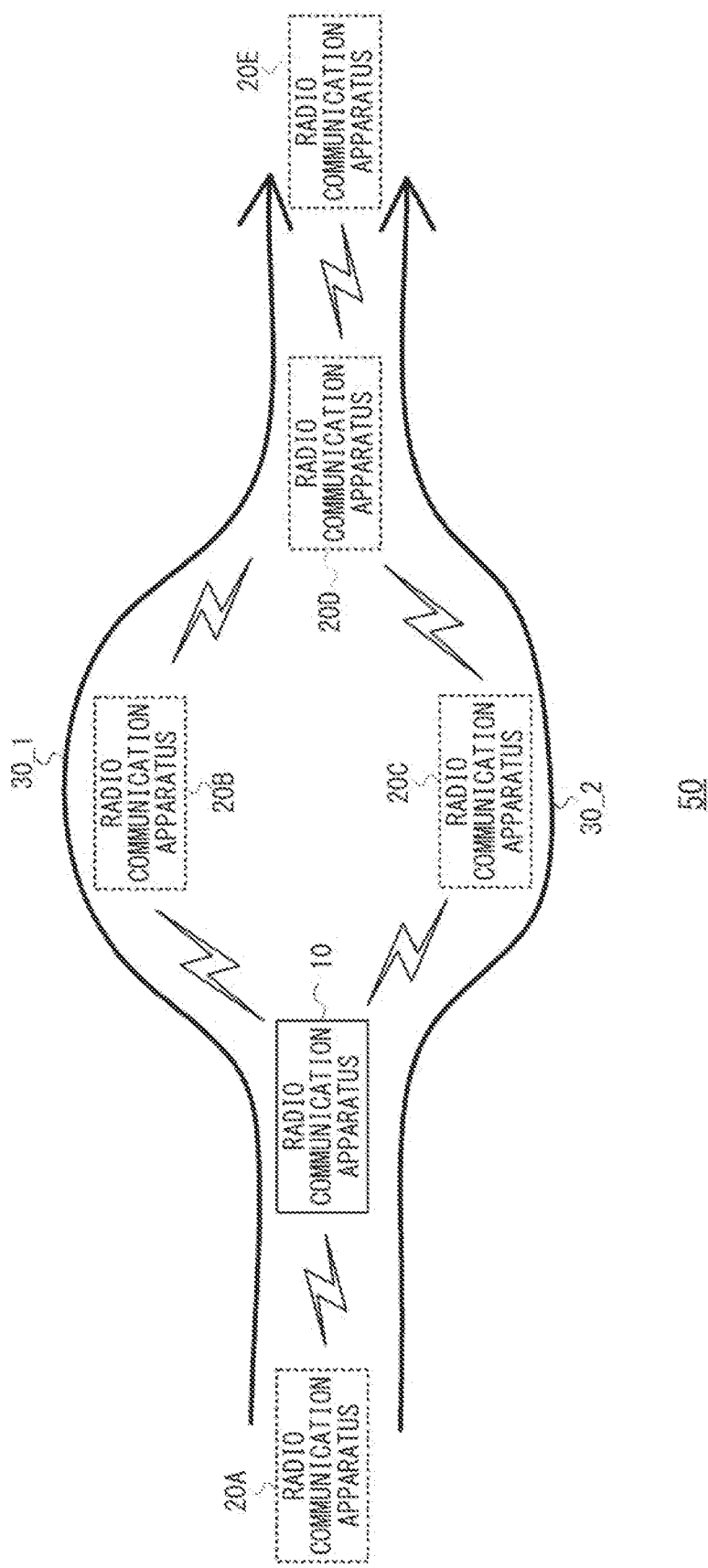
FIG. 3 is a schematic diagram showing an example of a configuration of a network in which a radio communication apparatus according to an example embodiment is used.

FIG. 2 is a block diagram showing an example of a configuration of a radio communication apparatus 10 according to an example embodiment. The radio communication apparatus 10 corresponds to the radio communication apparatus 1 described above. For example, as shown in FIG. 3, the radio communication apparatus 10 is an apparatus operated in a network 50 including redundant communication paths. The radio communication apparatus 10 performs radio communication with other radio communication apparatuses in such a network 50. Note that examples of the network 50 include, but not limited to, wireless mobile backhaul.

In the example shown in FIG. 3, the radio communication apparatus 10 is an apparatus that relays traffic transmitted from a radio communication apparatus 20A to a radio communication apparatus 20E, and can wirelessly transmit traffic to radio communication apparatuses 20B and 20C. Specifically, in the example shown in FIG. 3, there are communication paths 30_1 and 30_2 as communication paths that the radio communication apparatus 10 can use. The communication path 30_1 is a communication path through which traffic is transmitted to the radio communication apparatus 20D through the radio communication apparatus 20B, and the communication path 30_2 is a communication path through which traffic is transmitted to the radio communication apparatus 20D through the radio communication apparatus 20C.

Note that, in the following description, the other radio communication apparatuses 20A to 20E may also be referred to simply as radio communication apparatuses 20 when they do not need to be distinguished from one another.

The radio communication apparatus 10 can wirelessly transmit traffic by using only the communication path 30_1, or by using only the communication path 30_2. Further, the radio communication apparatus 10 can wirelessly transmit traffic by using both the communication paths 30_1 and 30_2. That is, in the network 50, communication may be performed by simultaneously using a plurality of communication paths. Note that, in FIG. 3, two communication paths 30_1 and 30_2 are shown as redundant communication paths. However, the number of redundant communication paths may be three or more. In such cases, the radio communication apparatus 10 can also wirelessly transmit traffic by using an arbitrary communication path(s) in a similar manner.

Details of the radio communication apparatus 10 will be described hereinafter. Note that each of the other radio communication apparatuses 20 may have a configuration similar to that of the radio communication apparatus 10. As shown in FIG. 2, the radio communication apparatus 10 includes a power-supply connection unit 100, a communication function unit 200, and a control unit 300.

The power-supply connection unit 100 is a power supply circuit that is connected to a power supply 150 and supplies, to each component of the radio communication apparatus 10, power necessary for the operation performed by the radio communication apparatus 10. The power supply 150 supplies power to the radio communication apparatus 10. The power supply 150 may be, for example, a commercial power supply, or may be a storage battery. A solar power generator may be used as the power supply 150 together with the storage battery. Note that a power supply 150 is provided for each of the radio communication apparatuses. That is, each of the radio communication apparatuses 20 is connected to a different power supply 150 (e.g., a dedicated power supply 150). It should be noted that the types of the power supplies 150 connected to the respective radio communication apparatuses are not necessarily the same as each other. This is because the type of an available power supply may be limited depending on the environment in which the radio communication apparatus is installed. As described above, each of the radio communication apparatus 10 and the radio communication apparatuses 20 is connected to, for example, either a storage battery or a commercial power supply.

The communication function unit 200 is a circuit that modulates and demodulates signals according to a known multi-level modulation mode, and transmits and receives radio waves. In particular, the communication function unit 200 modulates signals with a modulation multi-value number (modulation level) that is set under the control from the control unit 300, and transmits radio waves to other radio communication apparatuses 20. That is, the communication function unit 200 switches its modulation mode according to the control of the control unit 300. The communication function unit 200 modulates signals by using, for example, one of modulation modes using different modulation multi-value numbers such as QPSK (Quadrature Phase Shift Keying), 8PSK (Phase Shift Keying), 16QAM (Quadrature Amplitude Modulation), 64QAM, and 256QAM.

Figure 4:
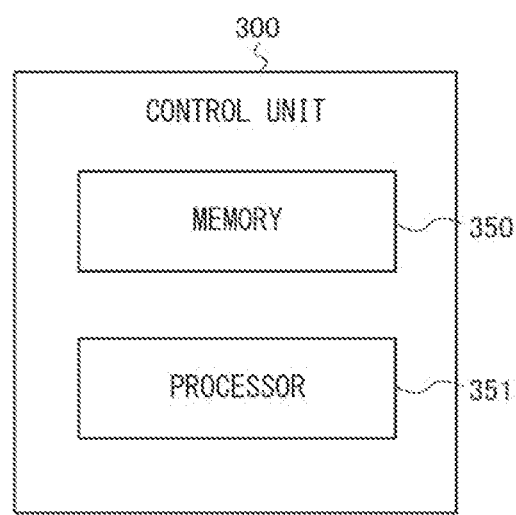
FIG. 4 is a block diagram showing an example of a configuration of a control unit.

The control unit 300 includes a power-supply information management unit 310, a database 320, and a communication management unit 330. Note that the control unit 300 is formed by using, for example, the configuration shown in FIG. 4. FIG. 4 is a block diagram showing an example of a configuration of the control unit 300. As shown in FIG. 4, the control unit 300 includes, for example, a memory 350 and a processor 351.

The memory 350 is formed of, for example, a combination of a volatile memory and a nonvolatile memory. The memory 350 is used to store software (a computer program) and the like including at least one instruction executed by the processor 351, and data and the like used for various types of processing performed by the control unit 300.

Each of the components of the control unit 300 shown in FIG. 2 is implemented by, for example, a program such as firmware. Specifically, the processor 351 loads software (a computer program) from the memory 350 and executes the loaded software, so that the processing in each of the components of the control unit 300 shown in FIG. 2 is performed.

The processor 351 may be, for example, a microprocessor, an MPU (Micro Processor Unit), or a CPU (Central Processing Unit). The processor 351 may include a plurality of processors.

As described above, the control unit 300 has functions as a computer. Further, the program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

The power-supply information management unit 310 corresponds to the power-supply information management unit 2 shown in FIG. 1. That is, the power-supply information management unit 310 manages power-supply information of other radio communication apparatuses 20 for each of the N redundant communication paths. For example, according to the example shown in FIG. 3, the power-supply information management unit 310 manages at least power-supply information of the radio communication apparatus 20B in the communication path 30_1 and power-supply information of the radio communication apparatus 20C in the communication path 30_2. Note that the power-supply information management unit 310 may manage power-supply information of radio communication apparatuses 20 other than the aforementioned radio communication apparatuses, and may manage the power-supply information of its host apparatuses (i.e., the power-supply information of the radio communication apparatus 10). Further, in the example shown in FIG. 3, the total number of redundant communication paths through which the radio communication apparatus 10 can transmit signals is two. However, as described above, there may be three or more redundant communication paths. In such a case, the power-supply information management unit 310 manages power-supply information of a radio communication apparatus(es) 20 for each of these communication paths.

The power-supply information management unit 310 acquires the power-supply information of the other radio communication apparatuses 20 through communication according to a routing protocol. More specifically, the power-supply information management unit 310 extends a known routing protocol, and uses the extended routing protocol that is adapted so that power-supply information as well as route information can be exchanged. That is, by using the routing protocol in which the contents of messages are extended so that power-supply information can also be notified (i.e., sent), the power-supply information management unit 310 exchanges the power-supply information with other radio communication apparatuses 20. The power-supply information management unit 310 manages the acquired power-supply information by using a database 320. As described above, in this example embodiment, since the power-supply information management unit 310 acquires power-supply information of other radio communication apparatuses 20 by receiving it therefrom, the power-supply information management unit 310 can successively acquire the latest power-supply information of the radio communication apparatuses 20.

FIG. 5 is a table showing an example of power-supply information managed by the database 320. As shown in FIG. 5, as the power-supply information, the power-supply information management unit 310 manages, for each radio communication apparatus, identification information (an apparatus name), a power-supply type, and a remaining battery amount of the radio communication apparatus. Note that the remaining battery amount is an attribute value that is included (i.e., used) when the power-supply type is a storage battery, and represents the remaining amount of the power stored (e.g., changed) in the storage battery.

Each of the radio communication apparatus 10 and the radio communication apparatuses 20 specifies the type of the power supply used by the radio communication apparatus itself. For example, each of the radio communication apparatus 10 and the radio communication apparatuses 20 may be equipped with a storage unit such as a memory that stores a value indicating the type of the power supply used by the radio communication apparatus itself, or may be equipped with a determination circuit that determines the power-supply type based on the difference in the configuration of the connection or the like. In such cases, each of the radio communication apparatus 10 and the radio communication apparatuses 20 specifies the type of the power supply used by the radio communication apparatus itself by reading a value stored in the storage unit or acquiring a result of a determination made by the determination circuit.

Further, each of the radio communication apparatus 10 and the radio communication apparatuses 20 acquires the remaining battery amount of the storage battery by using an arbitrary technique when the type of power supply used by the radio communication apparatus itself is a storage battery. For example, when the storage battery is an intelligent battery, the radio communication apparatus acquires the remaining battery amount of the storage battery by receiving data about the remaining battery amount managed by the storage battery from the storage battery. Further, the remaining battery amount may be estimated by monitoring the output voltage of the storage battery. Note that the power-supply information management unit 310 acquires the remaining battery amount of the power supply 150 (the storage battery) through the power-supply connection unit 100. However, the power-supply information management unit 310 may acquire the remaining battery amount directly from the power supply 150 (the storage battery).

The communication management unit 330 manages the network and controls communication performed by the radio communication apparatus 10 according to the routing protocol. Specifically, for example, the communication management unit 330 sets a modulation multi-value number for the communication function unit 200. Further, the communication management unit 330 determines a communication path(s) that the radio communication apparatus 10 will use.

The communication management unit 330 corresponds to the communication management unit 3 shown in FIG. 1. That is, the communication management unit 330 performs switching, based on the amount of traffic that the radio communication apparatus 10 should transmit (hereinafter also expressed as the amount of traffic to be transmitted) and the power-supply information managed by the power-supply information management unit 310, between communication using n communication paths and communication using m communication paths (m<n). In the network 50 shown in FIG. 3, for example, the communication management unit 330 performs switching between communication in which both the communication paths 30_1 and 30_2 are simultaneously used and communication in which either the communication path 30_1 or 30_2 is used. Note that, specifically, when the radio communication apparatus 10 performs communication simultaneously using a plurality of communication paths, it performs communication in which the plurality of communication paths are bundled by link aggregation.

In particular, in this example embodiment, when the amount of traffic to be transmitted has decreased to such an extent that a predetermined condition is satisfied while the radio communication apparatus 10 is performing communication using n communication paths, the communication management unit 330 switches the communication method to communication using m communication paths (m<n). Specifically, the communication management unit 330 switches the communication when the amount of traffic to be transmitted has decreased to an amount that the radio communication apparatus 10 can transmit even if the use of at least one of the currently-used communication paths is stopped.

Note that the communication management unit 330 determines a communication path(s) of which the radio communication apparatus 10 will stop the use (hereinafter also expressed as a communication path(s) to be stopped) according to the power-supply type of the radio communication apparatus 20 constituting the communication path. The communication management unit 330 preferentially determines a communication path(s) that passes through a radio communication apparatus 20 whose power-supply type is a storage battery as the communication path(s) to be stopped. That is, when the radio communication apparatus 10 switches the communication to communication using m communication paths, the communication management unit 330 stops the use of a communication path(s) in which a radio communication apparatus 20 whose power-supply type is a storage battery is used. In this way, it is possible to reduce the decrease in the remaining battery amount of the storage battery. Further, the remaining battery amount may be taken into consideration when the communication management unit 330 determines the communication path(s) to be stopped. That is, when the radio communication apparatus 10 switches the communication to communication using m communication paths, the communication management unit 330 may stop the use of a communication path in which a radio communication apparatus 20 whose power-supply type is a storage battery and of which the remaining battery amount of the storage battery is the smallest is used. By doing so, it is possible to preferentially maintain (i.e., save) the remaining battery amount of a storage battery whose remaining battery amount is smaller (or the smallest).

Further, when the amount of traffic to be transmitted has increased to such an extent that a predetermined condition is satisfied while the radio communication apparatus 10 is performing communication using m communication paths, the communication management unit 330 resumes the use of the communication path(s) of which the radio communication apparatus 10 has stopped the use (hereinafter also expressed as the stopped communication path(s)). Specifically, the communication management unit 330 resumes the use of the stopped communication path when the amount of traffic to be transmitted has increased to an amount that the radio communication apparatus 10 cannot cope with by using only the currently-used communication paths.

Further, the communication management unit 330 may change the modulation multi-value number used for the modulation process of data to be transmitted according to the amount of traffic to be transmitted. For example, when the amount of traffic to be transmitted has decreased to such an extent that a predetermined condition is satisfied, the communication management unit 330 decreases the modulation multi-value number. Specifically, when the amount of traffic to be transmitted has reduced to or below a radio communication capacity which the radio communication apparatus 10 has when a modulation multi-value number smaller than the currently-set modulation multi-value number is used, the communication management unit 330 decreases the modulation multi-value number.

Further, when the amount of traffic to be transmitted has increased to such an extent that a predetermined condition is satisfied, the communication management unit 330 increases the modulation multi-value number. Specifically, when the amount of traffic to be transmitted has increased to or above an amount that the communication apparatus 10 cannot cope with by using a radio communication capacity determined by the currently-set modulation multi-value number, the communication management unit 330 increases the modulation multi-value number.

Further, the communication management unit 330 also controls the communication function unit 200 so that it performs radio communication by using transmission power corresponding to the modulation multi-value number. When the modulation multi-value number is decreased, e.g., when the modulation mode is changed from 256QAM to QPSK, it is possible to reduce the transmission power by an amount corresponding to the system gain obtained by the decrease of the modulation multi-value number. In this way, it is possible to reduce the power consumption of the radio communication apparatus 10. Further, in general, it is possible to reduce power consumed during a receiving operation by reducing the modulation multi-value number. Therefore, it is possible to reduce the power consumption of other radio communication apparatuses 20 that receive radio signals from the radio communication apparatus 10. Note that the communication management unit 330 may determine a communication path(s) of which it decreases the modulation multi-value number based on the power-supply information managed by the power-supply information management unit 310. Specifically, the communication management unit 330 may reduce the modulation multi-value number for radio transmission using a communication path(s) that passes through another radio communication apparatus(es) 20 that operates using a storage battery as its power supply. Further, the communication management unit 330 may reduce the modulation multi-value number for radio transmission using a communication path that passes through another radio communication apparatus 20 which operates using a storage battery as its power supply and of which the remaining battery amount is the smallest. It is possible to reduce the decrease in the remaining battery amount of the storage battery by having the communication management unit 330 decrease the modulation multi-value number.

Next, an example of operations performed by the radio communication apparatus 10 will be described. FIG. 6 is a flowchart showing an example of operations performed by the radio communication apparatus 10. A flow of operations performed by the radio communication apparatus 10 will be described hereinafter with reference to FIG. 6.

In a step S100, the power-supply information management unit 310 acquires power-supply information of other radio communication apparatuses 20 by using a routing protocol, and registers the acquired information in the database 320.

Next, in a step S101, the communication management unit 330 periodically monitors the amount of traffic that the radio communication apparatus 10 should transmit. Then, the communication management unit 330 makes a decision about the monitored amount of traffic (hereinafter also expressed as the traffic amount). The communication management unit 330 determines whether or not the traffic amount has increased to such an amount that the radio communication apparatus 10 cannot transmit the traffic unless it changes the modulation multi-value number or changes the number of communication paths. When the traffic amount has increased to such an extent (Yes at step S102), the process proceeds to a step S108. When the traffic amount has not increased to such an extent (No at step S102), the communication management unit 330 determines whether or not the traffic amount has decreased to such an extent that the modulation multi-value number can be changed (i.e., reduced) or the number of communication paths number can be changed (i.e., reduced). When the traffic amount has decreased to such an extent (Yes at step S103), the process proceeds to a step S104. When the traffic amount has not decreased to such an extent (No at step S103), the process returns to the step S101.

In the step S104, the communication management unit 330 determines whether or not it is possible to stop the use of a redundant communication path(s). That is, the communication management unit 330 determines whether or not the traffic amount has decreased to such an amount that the radio communication apparatus 10 can transmit even if the use of at least one of the currently-used communication paths is stopped. When it is impossible to stop the use of any redundant communication path (No at step S104), the process proceeds to a step S105. When it is possible to stop the use of a redundant communication path(s) (Yes at step S104), the process proceeds to a step S106.

In the step S105, the communication management unit 330 decreases the modulation multi-value number. That is, the communication management unit 330 instructs the communication function unit 200 to switch the modulation mode to a modulation mode using a smaller modulation multi-value number than that of the currently-used modulation mode. Note that, as described above, the communication management unit 330 may determine a communication path(s) of which it decreases the modulation multi-value number based on the power-supply information. After the step S105, the process returns to the step S100.

On the other hand, in the step S106, the communication management unit 330 instructs the communication function unit 200 to change the communication path through which the traffic is transmitted. Specifically, the communication management unit 330 instructs the communication function unit 200 to stop, among the currently-used communication paths, the use of a communication path(s) in which a radio communication apparatus(es) 20 operated by a storage battery is used. As a result, the traffic that is originally supposed to be transmitted through the communication path that is determined to be stopped is transmitted through other communication paths. Note that when a plurality of communication paths each of which uses a radio communication apparatus 20 operated by a storage battery are used, the communication management unit 330 instructs the communication function unit 200 to stop the use of a communication path in which a radio communication apparatus 20 of which the remaining battery amount is the smallest is used.

After the step S106, the communication management unit 330 controls the communication function unit 200 so that it stops radio transmission through the communication path to be stopped in a step S107. After the step S107, the process returns to the step S100. Note that the communication path to be stopped may be changed according to the remaining battery amount. That is, when the remaining battery amount of a radio communication apparatus 20 constituting a currently-used communication path has decreased below the remaining battery amount of the radio communication apparatus 20 constituting the communication path of which the use has been stopped, the communication management unit 330 may switches (e.g., the communication management unit 330 may instruct the communication function unit 200 to switch) the communication path to be stopped to the currently-used communication path. That is, the communication path through which radio transmission is performed may be switched.

On the other hand, in the step S108, the communication management unit 330 determines whether or not the radio communication apparatus 10 can transmit the increased traffic amount by changing the currently-set modulation multi-value number. That is, the communication management unit 330 determines whether or not the radio communication apparatus 10 can transmit the traffic by switching the modulation mode to a modulation mode using a larger modulation multi-value number than that of the currently-used modulation mode. When it is possible to cope with the traffic by changing the modulation multi-value number (Yes at step S108), the process proceeds to a step S109. When it is impossible to cope with the traffic by changing the modulation multi-value number (No at step S108), the process proceeds to a step S110.

In the step S109, the communication management unit 330 increases the modulation multi-value number. That is, the communication management unit 330 instructs the communication function unit 200 to switch the modulation mode to a modulation mode using a larger modulation multi-value number than that of the currently-used modulation mode. After the step S109, the process returns to the step S100.

In the step S110, the communication management unit 330 instructs the communication function unit 200 to resume radio transmission through the communication path of which the use has been stopped. Then, in a step S111, the communication management unit 330 instructs the communication function unit 200 to transmit (a part of) the traffic to the communication path of which the use has been stopped. As a result, (a part of) the traffic is also transmitted through the communication path of which the use has been stopped. After the step S111, the process returns to the step S100.

An example embodiment has been described above. According to this example embodiment, the aspect (e.g., communication paths to be used) of communication is changed based on power-supply information of radio communication apparatuses. In particular, the number of redundant communication paths that are simultaneously used is changed based on the power-supply information. Therefore, it is possible, in a network in which communication may be performed by simultaneously using a plurality of communication paths, to improve (e.g., extend) the operating time of the whole network.

Note that the present disclosure is not limited to the above-described example embodiments, and they may be modified as appropriate without departing from the spirit and scope of the disclosure. For example, some of or all the processes performed by the components shown in FIG. 2 may be combined into a process(es) that is performed by one component, or may be divided into a larger number of processes performed by a larger number of components.

According to the present disclosure, it is possible to provide a radio communication apparatus, a communication method, and a program capable of, in a network in which communication may be performed by simultaneously using a plurality of communication paths, improving (e.g., extending) the operating time of the whole network.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A radio communication apparatus comprising:
at least one memory storing instructions; and
at least one processor configured to execute the instructions stored in the memory to:
manage power-supply information of another radio communication apparatus for each of N redundant communication paths (N is an integer equal to or greater than two); and
perform switching, based on an amount of traffic to be transmitted and the power-supply information, between communication using n communication paths (n is an integer no smaller than two and no greater than N) among the N communication paths and communication using m communication paths (m is an integer no smaller than one and smaller than n (i.e., m<n)) among the N communication paths.

2. The radio communication apparatus according to claim 1, wherein
the power-supply information includes a type of a power-supply, and
the processor is further configured to execute the instructions to, when the communication is switched to the communication using the m communication paths, stop use of a communication path in which another radio communication apparatus whose power-supply type is a storage battery is used.

3. The radio communication apparatus according to claim 1, wherein
the power-supply information includes a type of a power-supply and a remaining battery amount, and
the processor is further configured to execute the instructions to, when the communication is switched to the communication using the m communication paths, stop use of a communication path in which another radio communication apparatus whose power-supply type is a storage battery and of which a remaining battery amount of the storage battery is the smallest is used.

4. The radio communication apparatus according to claim 1, wherein the processor is further configured to execute the instructions to change a modulation multi-value number used for a process for modulating data to be transmitted according to the amount of traffic.

5. The radio communication apparatus according to claim 4, wherein the processor is further configured to execute the instructions to determine a communication path of which the modulation multi-value number is decreased based on the power-supply information.

6. The radio communication apparatus according to claim 1, wherein the processor is further configured to execute the instructions to receive the power-supply information from the other radio communication apparatus.

7. A communication method comprising:
managing power-supply information of another radio communication apparatus for each of N redundant communication paths (N is an integer equal to or greater than two); and
performing switching, based on an amount of traffic to be transmitted and the power-supply information, between communication using n communication paths (n is an integer no smaller than two and no greater than N) among the N communication paths and communication using m communication paths (m is an integer no smaller than one and smaller than n (i.e., m<n)) among the N communication paths.

8. A non-transitory computer readable medium storing a program for causing a computer to perform:
- a step of managing power-supply information of another radio communication apparatus for each of N redundant communication paths (N is an integer equal to or greater than two); and
- a step of performing switching, based on an amount of traffic to be transmitted and the power-supply information, between communication using n communication paths (n is an integer no smaller than two and no greater than N) among the N communication paths and communication using m communication paths (m is an integer no smaller than one and smaller than n (i.e., m<n)) among the N communication paths.

* * * * *